(12) United States Patent
Haumont et al.

(10) Patent No.: US 7,792,078 B2
(45) Date of Patent: Sep. 7, 2010

(54) FORWARDING A TERMINAL IDENTITY BETWEEN CORE NETWORK NODES

(75) Inventors: Serge Haumont, Helsinki (FI); Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 1335 days.

(21) Appl. No.: 10/492,255

(22) PCT Filed: Oct. 19, 2001

(86) PCT No.: PCT/EP01/12134

§ 371 (c)(1),
(2), (4) Date: Apr. 12, 2004

(87) PCT Pub. No.: WO03/037021

PCT Pub. Date: May 1, 2003

(65) Prior Publication Data

US 2004/0258019 A1    Dec. 23, 2004

(51) Int. Cl.
*H04W 4/00*    (2009.01)
(52) U.S. Cl. .................... 370/331; 370/338; 455/436
(58) Field of Classification Search .............. None
See application file for complete search history.

(56) References Cited

U.S. PATENT DOCUMENTS

| 6,349,099 B1* | 2/2002 | Larikka et al. ........... 370/395.1 |
| 6,397,065 B1* | 5/2002 | Huusko et al. ........... 455/435.2 |
| 6,792,278 B1* | 9/2004 | Ahmavaara et al. ......... 455/461 |
| 7,181,212 B2* | 2/2007 | Hogan et al. ................. 455/434 |
| 2001/0036829 A1* | 11/2001 | Costa et al. ................. 455/436 |
| 2002/0019241 A1* | 2/2002 | Vialen et al. ................. 455/458 |

FOREIGN PATENT DOCUMENTS

| WO | WO-9837721 | * 8/1998 |
| WO | WO 99/20071 | 4/1999 |
| WO | WO-9952317 | * 10/1999 |
| WO | WO 00/21318 | 4/2000 |
| WO | WO 00/36860 | 6/2000 |
| WO | WO 00/51374 | 8/2000 |

* cited by examiner

*Primary Examiner*—Bob A Phunkulh
(74) *Attorney, Agent, or Firm*—Slater & Matsil, L.L.P.

(57) ABSTRACT

A method, system and network element for forwards a terminal identity from a first core network node to a second core network node via a common radio access network. The common radio access network is arranged to incorporate a derived terminal identity received from the first core network node into a signaling message transmitted to the second core network node. The second core network node may then use this terminal identity to address the concerned terminal device.

42 Claims, 2 Drawing Sheets

FORWARDING A TERMINAL IDENTITY BETWEEN CORE NETWORK NODES

FIELD OF THE INVENTION

The present invention relates to a method, system and network elements for forwarding a terminal identity, such as an International Mobile Subscriber Identity (IMSI) or Temporary Mobile Subscriber Identity (TMSI) from a first core network node to at least a second core network node via a common radio access network, such as a Universal Mobile Telecommunications System (UMTS) Terrestrial Radio Access Network (UTRAN).

BACKGROUND OF THE INVENTION

The UMTS system consists of a number of logical network elements that each have a defined functionality. In the standards, network elements are defined at the logical level, but this quite often results in a similar physical implementation, especially since there are a number of open interfaces (for an interface to be "open", the requirement is that it has been defined to such a detailed level that the equipment at the endpoints can be from two different manufacturers). The network elements can be grouped based on similar functionality, or based on which sub-network they belong to. Functionally, the network elements are grouped into the Radio Access Network (RAN) which handles all radio-related functionality, and the core network (CN) which is responsible for switching and routing calls and data connections to external networks. To complete the system, a terminal device or user equipment (UE) provides an interface to a user.

From a specification and standardization point of view, both UE and UTRAN consist of completely new protocols, the design of which is based on the needs of the new Wideband Code Division Multiple Access (WCDMA) radio technology. On the contrary, the definition of the core networks is adopted from GSM (Global System for Mobile Communications). This gives the system with new radio technology a global base of known and rugged core network technology which accelerates and facilitates its introduction, and enables such competitive advantages as global roaming.

According to recent suggestions in standardization, an intra-domain connection of RAN nodes to several CN nodes may be used to connect CN nodes of multiple operators to a single RAN. A Non-Access Stratum (NAS) node selection function in the RAN nodes differentiates between CN nodes which may be of different operators. Preferably, the available network resource identifier (NRI) values are split between the operators. The NAS node selection function in the RAN node is configured to know which NM values belong to which operator. A mobile terminal which is not yet assigned to a CN node, there is no CN node configured for the NM indicated by the mobile terminal, is assigned to an available CN node of that operator which uses the indicated NM value. When no NRI value can be derived, the mobile terminal is as signed to a CN node selected from all available CN nodes. However, the selection of a CN node may result in the assignment to a CN node of a "wrong" operator as, for example, the NM may be derived from a TMSI which was allocated by a CN node of another network or by a CN node of an area which does not use the intra-domain connection of RAN nodes to multiple CN nodes. In such a case, the CN node rejects the attach or update request procedure. The NAS node selection function in the RAN node then selects an available CN node of another operator.

Currently, the TMSI or IMSI is provided in the attached message. Due to the above RAN sharing concept, each selected new CN node needs to derive the IMSI again. Deriving the IMSI includes radio signaling for identity request and authentication which implies significant delays. Such delays may exceed normal routing area update (RAU) procedure timings triggering the mobile terminal to resend its request message. Thus, network signaling is increased and a risk of misbehavior of the mobile terminal is introduced. Moreover, sending the IMSI several times over the radio interface is a security risk which should be avoided.

SUMMARY OF THE INVENTION

It is therefore an object of the present invention to provide a concept for forwarding the terminal identity of a terminal device between core network nodes sharing a common RAN, by means of which radio signaling and delays can be reduced and security enhanced.

This object is achieved by a method for forwarding a terminal identity from a first core network node to a second core network node, said method comprising the steps of:

deriving said terminal identity at said first core network node;

transmitting said derived terminal identity to a radio access network shared by said first and second core network nodes;

adding said terminal identity to a signaling message generated at said shared radio access network; and transmitting said signaling message to said second core network node.

Preferably, this signaling message is the Initial signaling message used to establish a connection to the second core network node. It may also be a message dedicated for this purpose, or any signaling message sent by the radio access network to the second core network node, after the radio access network has received the terminal identity.

Furthermore, the above object is achieved by a system for forwarding a terminal identity between core network nodes, said system comprising:

a first core network node arranged to derive said terminal identity from a signaling message received from a concerned terminal device; and a radio access network shared by said first core network node and a second core network node and arranged to receive said derived terminal identity from said first core network node, and to add said received terminal identity to an initial signaling message;

wherein said second core network node is arranged to receive said initial signaling message and to use said added terminal identity for addressing said terminal device.

Additionally, the above object is achieved by a network element of a radio access network, said network element being arranged to receive a derived terminal identity from a first core network node, to add said terminal identity if available to a signaling message, and to transmit said initial signaling message to an other core network node.

In addition thereto, the above object is achieved by a network element of a core network, said network element being arranged to extract a terminal identity of a terminal device from an initial signaling message generated at a radio access network, and to use said terminal identity for an initial access to said terminal device.

Further, the above object is achieved by a network element of a core network, said network element being arranged to derive a terminal identity from a signaling message received from a terminal device, to evaluate said terminal identity as to whether said terminal device is to be served by said core network, and to transmit said derived terminal identity together with a request for re-direction to a radio access network if said evaluation indicates that said terminal device is to be served by another core network.

Accordingly, additional delays due to unnecessary signaling requirements of the procedure can be minimized in RAN sharing concepts, since the terminal identity which has already been derived by the network node of the first core network can directly be used by the network node of the second core network without initiating a new deriving mechanism. Thereby, the risk of misbehaviors of the terminal device due to such a delay or the security risk due to additional transmissions of the terminal identity over the radio interface can be avoided. Additionally, the proposed solution of adding the derived terminal identity to an initial RAN signaling message provides the advantage that only small changes in the corresponding RAN signaling protocols are required.

Moreover, security and location update procedures can be accelerated, since the terminal identity is sent to the network node of the second core network from a trusted source, such that the location update can be performed immediately to the subscriber data base without waiting for the authentication procedure to be made over the radio interface. This again reduces the signaling in the air interface.

The initial signaling message may preferably be a RANAP (Radio Access Network Application Part) Initial UE Message. Due to the fact that the Initial UE Message already includes specific information required by the addressed core network, such as a core network domain indicator and other domain specific parameters, the new feature can be introduced at small protocol changes. The terminal identity is preferably an IMSI. But it may also be a Packet-Temporary Mobile Subscriber Identity (P-TMSI or PTMSI) or TMSI, or any other terminal identity.

According to an advantageous further development, security parameters may be transmitted together with the terminal identity from the first core network node via the shared access network to the second core network node. These security parameters, may comprise a simple indication that the radio connection is already secure (i.e. ciphering and integrity check are in use) and/or an integrity protection Information, encryption information, key status. Thereby, an authentication procedure is no longer required at the second core network node because authentication is normally used to make sure of the terminal identity and to derive security parameters (both are known from UTRAN with this invention)

According to another advantageous further development, the terminal identity may be evaluated at the network node of the first core network, and the transmitting step to the radio access network may be performed if the result of the evaluation indicates that the terminal device is to be served by another core network. Thereby, knowledge gathered at the wrong first core network can be used at the correct second core network and does not have to be derived again.

In this case, the transmitting step to the access network may comprise the step of transmitting a re-direction request from said network node of said first core network to said radio access network.

According to another advantageous further development, the transmitting step to the access network may be performed during a Common identification (ID) procedure. Additionally, a security mode procedure may be performed directly between the network node of the first core network and the access network. Thereby, signaling via the air interface to the terminal device can be reduced.

The network node of the first core network may be an SGSN or an MSC/VLR, while the network node of the second core network may be an MSC/VLR or an SGSN, respectively.

Further advantageous developments are defined in the dependent claims.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENTS

Figure 1:
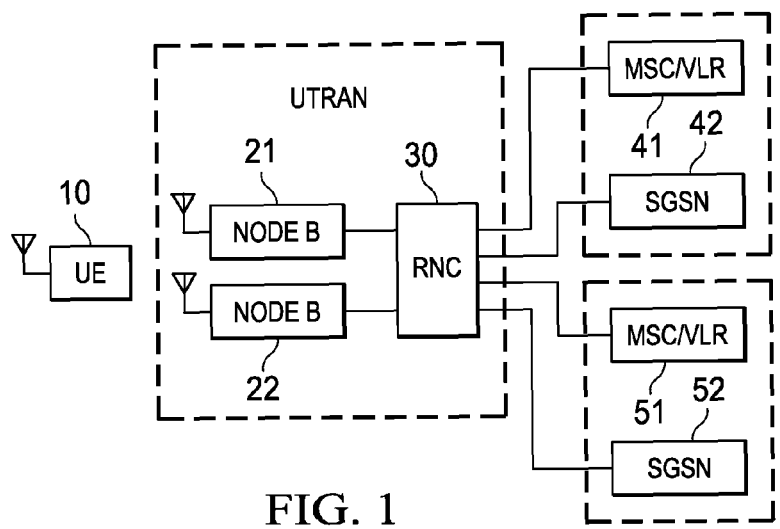
FIG. 1 shows a schematic block diagram of a network architecture having a shared radio access network, in which the present invention can be implemented.

The preferred embodiments will now be described based on a UMTS network architecture in which two core networks CN1, CN2 are connected to a shared UTRAN, as indicated in FIG. 1.

According to FIG. 1, a user equipment (UE) 10 is connected via a radio interface to a radio network sub-system (RNS) of the UTRAN. The RNS comprises two node Bs 21,22 which are arranged to convert the data flow between an Uu interface (provided between the UE 10 and the respective node B) and Iub interfaces provided between a Radio Network Controller (RNC) 30 and the node Bs 21, 22). However, it is noted, that the term "node B" may be replaced by the more generic term "base station" which has the same meaning. The RNC 30 owns and controls the radio resources in its domain, i.e., the node Bs 21, 22 connected to it. The RNC 30 is the service access point for all services the UTRAN provides to core net-works (indicated as dotted boxes in FIG. 1) which share the UTRAN. Each of the core networks comprises a Mobile Services Switching Center/Visitor Location Register (MSC/VLR) 41, 51 having a switching function (MSC) and data base (VLR) serving the UE 10 in its current location for circuit switched (CS) services. The MSC function is used to switch CS transactions, and the VLR function holds a copy of a visiting user's service profile, as well as more precise information on the location of the UE 10 within the serving system. The part of the core network which is accessed via the MSC/VLRs 41, 51 is referred to as the CS domain.

Furthermore, each of the core networks comprises a Serving GPRS (General Packet Radio Services) Support Node (SGSN) 42, 52 having a functionality similar to that of the MSC/VLRs 41, 51 but being typically used for packet switched (PS) services. The part of the network that is accessed via the SGSNs 42, 52 is referred to as the PS domain.

Thus, the system consists of at least one mobile terminal, i.e. the UE 10, and one radio access network, i.e. the UTRAN, and at least two core networks being able to serve the UE 10 in a given area. To reduce the signaling requirements via the air interface between the UTRAN and the UE 10, it is suggested to transmit an authenticated terminal identity, e.g. IMSI, from a first one of the core networks to the UTRAN, and to forward this terminal identity from the UTRAN to a second one of the core networks e.g. when the UE 10 sends an initial message to the second one of the core networks, or when the first one was the wrong core network, or when a call is established through the second one of the core networks.

Furthermore, the preferred embodiments may be improved in that security parameters (e.g. Integrity Key (IK), Ciphering Key (CK)) are sent along with the terminal identity via the UTRAN from one of the core networks to the other. This provides the advantage that the other core network does not have to perform an authentication procedure across the radio interface to derive new security parameters. It is to be noted that the security parameters may as well be sent by the first one of the core networks to the UTRAN in a separate procedure.

Figure 2:
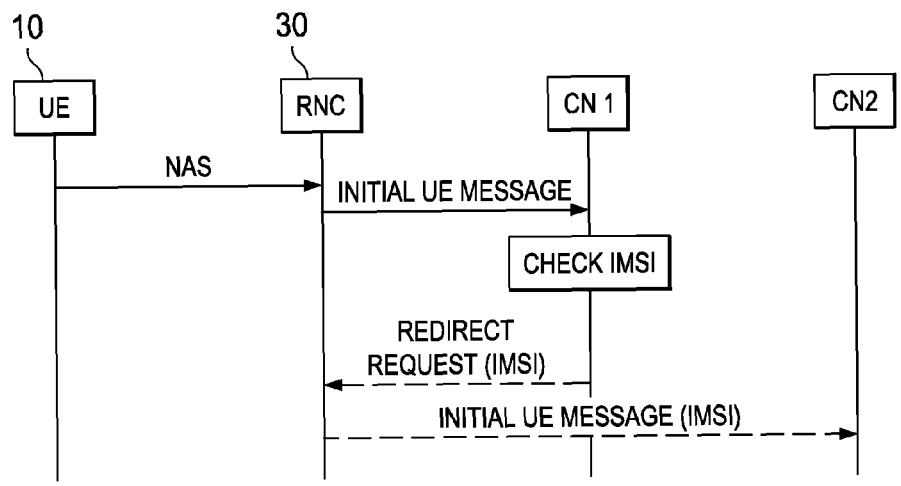
FIG. 2 shows a signaling diagram indicating a forwarding of a terminal identity between two core networks, according to a first preferred embodiment.

FIG. 2 shows a signaling diagram of a first preferred embodiment, where the RAN sharing is based on flexibility principles of the Iu interface between the UTRAN and first and second core network nodes CN1, CN2. As already mentioned in the introductory portion, an attach or update request may be sent to a new core network which is not the proper one for the concerned terminal device, i.e. it belongs to a different operator.

As shown in FIG. 2, a NAS (None-Access Stratum) message (i.e. a message which belongs to a protocol between the UE 10 and a desired core network, that it is not terminated in the UTRAN) is transmitted from the UE 10 to the RNC 30 of the UTRAN via one of the node Bs 21, 22. This NAS message may be an attach or routing area update (RAU) request to be routed to the respective core network. To achieve this, the RNC 30 is arranged to incorporate this attach or RAU request into an Initial UE message of the RANAP (i.e. a signaling protocol in the Iu interface that contains all the control information specified for the radio network layer).

The purpose of the Initial UE Message procedure is to establish an Iu signaling connection between a CN domain and the RNC 30 and to transfer the initial NAS packet data unit (NAS-PDU) to the concerned core network. This procedure uses a connection oriented signaling. When the RNC 30 has received from the radio interface the NAS message to be forwarded to a CN domain to which a Iu signaling connection for the UE 10 does not exist, the RNC 30 initiates the initial UE Message procedure and sends an Initial UE Message to the concerned first core network node CN1, as indicated in FIG. 2. In addition to the received NAS-PDU, the RNC 30 may add other information to the Initial UE Message. This other information may comprise a CN domain indicator, indicating the CN domain toward which this message is sent, a Location Area Identity (LAI) which was the last LAI indicated to the UE 10 by the UTRAN via the current radio resource control (RRC) connection, or, if the UTRAN had not yet indicated any LAI to the UE via the current RRC connection, then the LAI of the cell via which the current RRC connection was established, an additional Routing Area Code (RAC) if the PS domain is used, a service area corresponding to at least one of the cells from which the UE 10 is consuming radio resources, an Iu signaling connection identifier, and/or a global RNC identifier. The Iu signaling connection identifier is allocated by the RNC 30, and is required by the first core network node CN1 for the duration of the Iu connection.

According to the first preferred embodiment, the first core network node CN1, i.e. the MSC\VLR 41 or the SGSN 42, receives the attach or routing area update or location area update request via the Initial UE Message from the UE 10 and de-rives the IMSI by, e.g., a corresponding radio signaling which may include an identity request and an authentication procedure, and thus implies significant delays (IMSI and security parameters may also be requested from previous CN node as well). In a preferred implementation, it is recommended to follow the identity re-quest procedure by an authentication procedure to ensure that the UE is who it claims to be. When knowing the IMSI, the first core network node CN1 may evaluate if it is the appropriate node to serve this IMSI (IMSI does indicate the home operator of the subscriber). The evaluation may also be made on the basis of the corresponding PTMSI/TMSI of the UE 10 if the first core network node CN1 knows how the PTMSI/TMSI was allocated. In practice, this is possible if the old radio access/ location access (RA/LA) belongs to same network. The evaluation indicates whether the UE 10 should be served by another core network sharing the UTRAN.

In particular, the first core network node CN1 may send a re-direct request message comprising the IMSI, and optionally security parameters to the RNC 30 if the UE 10 should be served by the second core network node CN2. It should be noted that security parameters are typically sent to the UTRAN with a security mode command. However, as in this case, the first core network node CN1 decided to redirect this mobile station (MS) to another CN node, it has not sent the security mode command. Therefore the security parameters should be inserted in redirect request message. Thus, the first network node queried at the core network derives the IMSI of the UE 10 and indicates this IMSI, and optionally security parameters to the UTRAN in the re-direct request, if the first core network node CN1 is not the proper one.

Then, the RNC 30 of the UTRAN adds the derived IMSI, and optionally security parameters to a new RANAP initial UE Message carrying the attach or routing area update request of the UE 10, and transmits this new initial UE Message to the network node, e.g. the MSC/VLR 51 or the SGSN 52, of the second core network node CN2, so that the second core network node CN2 does not have to derive the IMSI, and if security parameters are included, to perform authentication again.

In the following Table 1, an example is shown for a protocol change with regard to the available information elements (IEs) of the Initial UE Message. The proposed new conditional information elements "Terminal Identity" and "Security Parameters" are emphasized. In Table 1, "M" indicates mandatory Es and "C" indicates conditional IEs.

TABLE 1

| IE/Group Name | Presence |
| --- | --- |
| Message Type | M |
| CN Domain Indicator | M |
| LAI | M |
| RAC | C - ifPS ? |
| Service Area Identifier (SAI) | M |
| NAS-PDU | M |
| Iu Signalling Connection Identifier | M |
| Global RNC-ID | M |
| Terminal Identity | C - if available |
| Security parameters | C - if available |

By the transmission of the security parameters, it can be avoided that the first node receiving the Initial UE Message and the final node accepting the request of the UE 10 have both to perform the authentication procedure.

In general, the above re-directing or forwarding procedure between the core networks can be repeated until a correct core network of the right operator has been reached, if the UTRAN is shared by more than two core networks.

In addition, the idea described in FIG. 2 is also applicable if the two core network nodes belong to the same operator, and Iu Flex is supported. In this case, when overloaded, the first CN node (e.g. SGSN) decides to redirect a Routing area update to another SGSN. In this case, the signaling is strictly identical to what is shown in FIG. 2.

Figure 3:
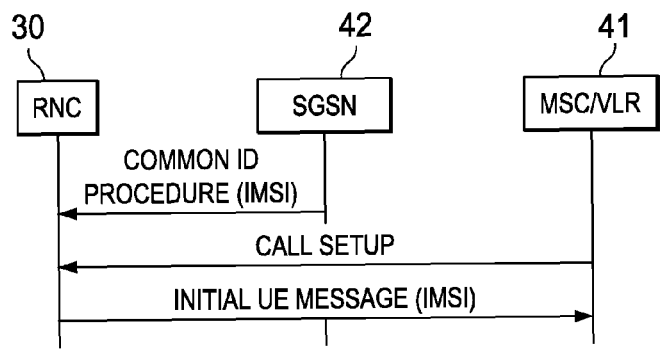
FIG. 3 shows a signaling diagram indicating a forwarding of a terminal identity between two core networks, according to a second preferred embodiment.

FIG. 3 shows a signaling diagram of a forwarding procedure according to a second preferred embodiment. In the second embodiment, the IMSI which has been derived e.g. at the SGSN 42 may be transmitted to the RNC 30 of the UTRAN in the course of a Common ID procedure. The Common ID management is a function for sending the permanent identification of the UE 10 from a core network to the UTRAN to allow paging coordination from possibly two different CN domains. If the UE 10 is a packet terminal device, it is expected to have a radio connection established during quite a long time, to decrease packet transfer delay. Thus, the probability is high that the UTRAN already knows the IMSI of the UE 10, since the Common ID procedure was already performed. Furthermore, security parameters may already be available since a security mode procedure should have also already been performed between e.g. the SGSN 42 and the UTRAN to set the ciphering and integrity checking on or off.

Thus, when a call setup is received by the RNC 30 from the MSC/VLR 51, in order to establish a call, the RAN 30 already knows the IMSI, and typically the security parameters of the UE 10. Thus, the RNC 30 may add this IMSI and optionally the security parameters to an Initial UE Message which is sent from the RNC 30 to the MSC/VLR 51. Thereby, it can be avoided that the MSC/VLR 51 has to issue an identity request toward the UE 10 to derive the IMSI.

It is noted that the above forwarding procedure according to the second embodiment may as well be performed from the MSC/VLR 51 to the SGSN 42 by using a similar mechanism. Thus, in general, the procedure may be performed between an SGSN or an MSC/VLR and an MSC/VLR or, respectively, an SGSN. It should be noted, that the idea described above is applicable regardless if MSC and SGSN belong to the same operator or to different operators.

In addition, if the security parameters are included, the MSC/VLR 51 does not have to perform the authentication over the radio interface, but the security mode procedure can be directly initiated at the RNC 30 to start ciphering/integrity check with the security parameters it received.

Figure 4:
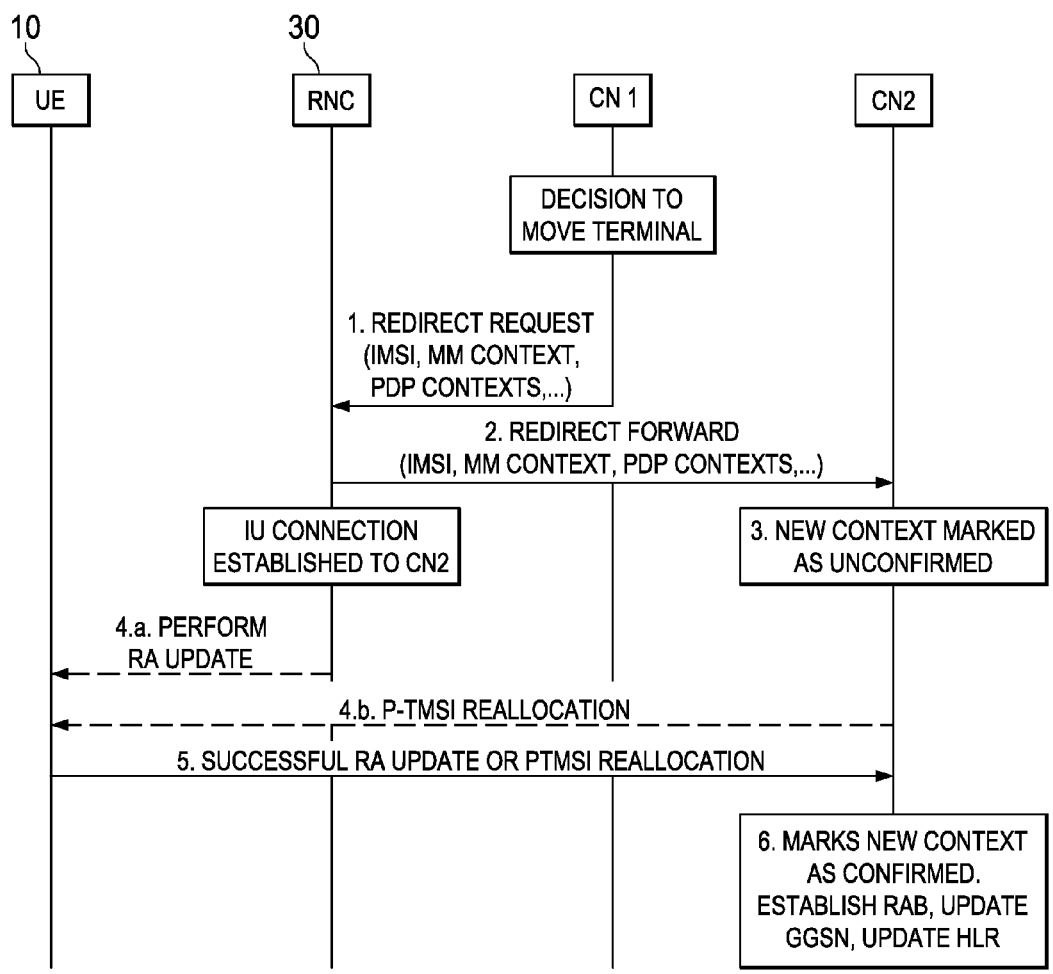
FIG. 4 shows a signaling diagram indicating a forwarding of a terminal identity between two core networks, according to a third preferred embodiment.

FIG. 4 shows a signaling diagram of a redirecting procedure according to a third preferred embodiment. In the third embodiment, the first core network node CN1 decides to redirect a registered (i.e. attached) terminal to the second core network node CN2. The cause of the redirection may be a command from the O&M (Operation and Maintenance) system (e.g. if the first core network node CN1 needs to be switched off for maintenance or upgrade), a risk of overload, the request of a feature not supported in the first core network node CN1. In this description the first and second core network nodes CN1, CN2 are preferably SGSNs. For example, the first core network node CN1 may have received a request to activate a real time PDP (Packet Date Protocol) context (L3 message) with high throughput, that it cannot accept due to its current internal load situation.

In step 1, the first core network node CN1 sends a redirect request message to the RNC 30. This message contains the identity of the terminal, as well as preferably MM (Mobility Management) and PDP context information related to the terminal. If the full MM and PDP context information are not transmitted, at least the terminal identity in the form of P-TMSI and RA identity is needed, and the rest of the PDP context and MM contexts could be retrieved during step 4*a*.

If the redirect was triggered by an L3 request which could not be served by the first core network node CN1, the L3 message is also embedded in the redirect message. The redirect message may also contain an identifier of the second core network node CN2, or alternatively the new node may be selected by the RNC 30. Optionally, the redirect message may also contain a cause indicating the reason of the redirection. It should be noted that the first core network node CN1 is still storing MM and PDP context for this terminal, and possibly handling data traffic.

When receiving the redirect request message, the RNC 30 sends in step 2 a redirect forward message to the second core network node CN2. This message is preferably used to establish the Iu signaling connection to the second core network node CN2. Therefore after this point all the L3 signaling message sent by the terminal will reach the second core network node CN2 (and not anymore the first core network node CN1). However, data transfer is still going through the first network node CN1, if radio bearer were established toward the first core network node CN1 before the redirect request message was sent. In addition, the Iu connection toward the first core network node CN1 has not been released, but is put on hold by the RNC 30. It will normally be released by the first core network node CN1 when receiving cancel message from HLR in step 6.

In step 3, when receiving the redirect forward message, the second core network node CN2 stores the terminal identity, and all associated MM and PDP context, but marks this context as unconfirmed. If an L3 message was received, the second core network node CN2 will store it in order to answer it if possible after the context will be confirmed.

We here propose two possible examples, how the context can be confirmed.

In a first example, (step 4*a*), the RNC 30 will, after having successfully delivered the redirect forward message, send an indication to the terminal to perform a Routing Area Update (RAU) procedure. A routing area update may thus be requested by the RNC 30 even if the routing area is not changed. The RNC 30 may do this by adding a new parameter (e.g. RAU Requested) to an existing RRC message UTRAN Mobility Information or by sending a new RRC message (e.g. RAU Requested) introduced for requesting routing area update. It should be noted that as the Iu signaling connection has been established in step 2 toward the second core network node CN2, so it will receive the RAU request.

Then a standard Routing Area update procedure may be performed as described in the 3GPP specification 23.060. This is the preferred solution for a case where in step 1 the full MM and PDP context was not transferred. If the full MM and PDP context was transferred, the standard Routing Area update procedure may be optimized by not requesting the MM and PDP context from the old SGSN (i.e. SGSN context request; response and acknowledge message are omitted). It should be noted that in this scenario there is no need to forward packets from the first core network node CN1 to the second core network node CN2 because the first core network node CN1 will maintain its radio access bearer (RAB) established toward the RNC 30 until it receives a cancel message from the Home Location Register (HLR) (or more precisely a short time after receiving the cancel message to avoid losing packets). As a part of the RAU procedure, the second core network node CN2 updates the HLR (triggering HLR to send cancel message to the first core network node CN1), updates the Gateway GPRS Support Node (GGSN), and establishes the RAB from the second core network node CN2 to the RNC 30.

In a second example (step 4b), which is possible only if the full MM and PDP context were transferred in steps 1 and 2, the second core network node CN2 performs a P-TMSI reallocation procedure toward the UE 10. Because it is assumed that the first and second core network nodes CN1, CN2 share the same RAN based on the system described in the 3GPP specification 23.236, the change of the PTMSI is enough to communicate to the UE 10 the identity of the second core network node CN2 (called Network Resource Identifier in the 3GPP specification 23.236).

In both examples, after signaling of successful PTMSI reallocation or RA update in step 5, the second core network node CN2 marks the new context as confirmed, updates the HLR (triggering HLR to send cancel message to CN1), updates the GGSN, and establishes the RAB from the second core network node CN2 to the RNC 30 (step 6).

Therefore, after step 6, the unconfirmed part is deleted from the terminal context in the second core network node CN2, and the UE 10 has been successfully moved from the first core network node CN1 to the second core network node CN2 without losing its connection. An important benefit of this solution is that it does not requires changes to the terminal, i.e. UE 10.

It is noted that the description above applies to a successful case. It will be described below how the system should behave if for example the terminal is not reachable and so step 4a or 4b cannot be performed successfully. It should then be distinguished between two possibilities, either the UE 10 comes back before the Iu connection is released, or after.

If the UE 10 comes back before the Iu connection is released, the L3 message will be sent to second core network node CN2. If the UE 10 is sending a RAU request message, the case 4a will apply. If the UE 10 sends another message (e.g. service request), the second core network node CN2 performs at first a PTMSI reallocation as described in step 4b, and after that answers the service request message. If the UE 10 sends data, it will still go through the first core network node CN1 as the RAB are still established (if not, a service request message is needed).

When the Iu connection is released, this shall be indicated to both first and second core network nodes CN1, CN2. The second core network node CN2 shall always accept the Iu connection request, and shall erase the unconfirmed context after the Iu release. The reason is that when the UE 10 will come back, the NAS node selection function (defined in the 3GPP specification 23.236) of the RNC 30 will direct the signaling message to the first core network node CN1 as the PTMSI has not been changed in the UE 10. If the UE 10 comes back after the Iu connection is released, it will be handled normally by the first core network node CN1. In this error case, although the terminal redirection has failed it could be noticed that it had no impact on the terminal.

Thus, signaling requirements can be reduced by the proposed forwarding procedure, and attach or update requests can be re-directed at minimized additional delays.

It is noted that the present invention can be implemented in any radio access network which is connected to more than one core network node (e.g. in GSM as well) to reduce signaling in the air interface, when data transmission is performed between core network nodes via the same radio access network. The names of various functional entities, such as the RNC 30 may be different in different cellular networks. The names used in the context of the preferred embodiments are not intended to limit or restrict the invention. The preferred embodiments may thus vary within the scope of the attached claims.

The invention claimed is:

1. An apparatus, configured to:
    derive a terminal identity of a user equipment at a first core network node;
    determine that said user equipment will be served by a second core network node without a request therefrom; and
    transmit said terminal identity of said user equipment via a radio access network to said second core network, thereby allowing said second core network node to serve said user equipment without deriving said terminal identity.

2. The apparatus as recited in claim 1 further configured to receive one of an attach, routing area update and location area update from said user equipment.

3. The apparatus as recited in claim 1 further configured to authenticate said terminal identity of said user equipment and transmit security parameters with said terminal identity of said user equipment via said radio access network to said second core network node, thereby allowing said second core network node to serve said user equipment without performing an authentication procedure.

4. The apparatus as recited in claim 1 further configured to transmit said terminal identity of said user equipment during a common identification procedure.

5. The apparatus as recited in claim 1 further configured to transmit said terminal identity of said user equipment in a redirect request message in response to a network command, an overload risk or a request for a non-supported feature.

6. The apparatus as recited in claim 1 further configured to transmit said terminal identity of said user equipment in a redirect request message including context information.

7. A method, comprising:
    deriving a terminal identity of a user equipment at a first core network node;
    determining that said user equipment will be served by a second core network node without a request therefrom; and
    transmitting said terminal identity of said user equipment via a radio access network to said second core network, thereby allowing said second core network node to serve said user equipment without deriving said terminal identity.

8. The method as recited in claim 7 further comprising receiving one of an attach, routing area update and location area update from said user equipment.

9. The method as recited in claim 7 further comprising authenticating said terminal identity of said user equipment and transmitting security parameters with said terminal identity of said user equipment via said radio access network to said second core network node, thereby allowing said second core network node to serve said user equipment without performing an authentication procedure.

10. The method as recited in claim 7 further comprising transmitting said terminal identity of said user equipment in a redirect request message in response to one of a network command, an overload risk and a request for a non-supported feature.

11. An apparatus, configured to:
    receive a terminal identity of a user equipment when a first core network node determines that said user equipment will be served by a second core network node without a request therefrom; and transmit said terminal identity of said user equipment to said second core network node, thereby allowing said second core network node to serve said user equipment without deriving said terminal identity.

12. The apparatus as recited in claim 11 further configured to receive security parameters with said terminal identity of said user equipment and transmit said security parameters with said terminal identity of said user equipment to said second core network node, thereby allowing said second core network node to serve said user equipment without performing an authentication procedure.

13. The apparatus as recited in claim 11 further configured to receive said terminal identity of said user equipment during a common identification procedure.

14. The apparatus as recited in claim 11 further configured to receive said terminal identity of said user equipment in a redirect request message from said first core network node in response to one of a network command, an overload risk and a request for a non-supported feature.

15. The apparatus as recited in claim 11, further configured to receive said terminal identity of said user equipment in a redirect request message including context information from said first core network node.

16. The apparatus as recited in claim 11 further configured to transmit said terminal identity of said user equipment in one of a radio access network application part (RANAP) initial user equipment (UE) message and a redirect forward message to said second core network node.

17. The apparatus as recited in claim 11 further configured to transmit said terminal identity of said user equipment in a redirect forward message including context information to said second core network node, said second core network node being configured to mark unconfirmed context information as confirmed or erase said unconfirmed context information.

18. The apparatus as recited in claim 11 further configured to transmit a routing area update request to said user equipment.

19. A method, comprising:
receiving a terminal identity of a user equipment when a first core network node determines that said user equipment will be served by a second core network node without a request therefrom; and
transmitting said terminal identity of said user equipment to said second core network node, thereby allowing said second core network node to serve said user equipment without deriving said terminal identity.

20. The method as recited in claim 19 further comprising receiving security parameters with said terminal identity of said user equipment and transmitting said security parameters with said terminal identity of said user equipment to said second core network node, thereby allowing said second core network node to serve said user equipment without performing an authentication procedure.

21. The method as recited in claim 19 further comprising receiving said terminal identity of said user equipment in a redirect request message from said first core network node in response to one of a network command, an overload risk and a request for a non-supported feature.

22. The method as recited in claim 19 further comprising transmitting said terminal identity of said user equipment in one of a radio access network application part (RANAP) initial user equipment (UE) message and a redirect forward message to said second core network node.

23. The method as recited in claim 19 further comprising transmitting a routing area update request to said user equipment.

24. A communication system, comprising:
a first network node configured to derive a terminal identity of a user equipment and determine that said user equipment will be served by a second core network node without a request therefrom; and
a radio access network, shared by said first core network node and said second core network node, configured to receive said terminal identity of said user equipment and transmit said terminal identity of said user equipment to said second core network node, thereby allowing said second core network node to serve said user equipment without deriving said terminal identity.

25. The communication system as recited in claim 24 wherein said first core network node is further configured to receive one of an attach, routing area update and location area update from said user equipment.

26. The communication system as recited in claim 24 wherein said first core network node is further configured to authenticate said terminal identity of said user equipment, said radio access network being further configured to receive security parameters with said terminal identity of said user equipment and transmit said security parameters with said terminal identity of said user equipment to said second core network node, thereby allowing said second core network node to serve said user equipment without performing an authentication procedure.

27. The communication system as recited in claim 24 wherein said radio access network is further configured to receive said terminal identity of said user equipment during a common identification procedure.

28. The communication system as recited in claim 24 wherein said radio access network is further configured to receive said terminal identity of said user equipment in a redirect request message from said first core network node in response to one of a network command, an overload risk and a request for a non-supported feature.

29. The communication system as recited in claim 24 wherein said radio access network is further configured to receive said terminal identity of said user equipment in a redirect request message including context information from said first core network node.

30. The communication system as recited in claim 24 wherein radio access network is further configured to transmit said terminal identity of said user equipment in one of a radio access network application part (RANAP) initial user equipment (UE) message and a redirect forward message to said second core network node.

31. The communication system as recited in claim 24 wherein radio access network is further configured to transmit said terminal identity of said user equipment in a redirect forward message including context information to said second core network node, said second core network node being configured to mark unconfirmed context information as confirmed or erase said unconfirmed context information.

32. The communication system as recited in claim 24 wherein said radio access network is further configured to transmit a routing area update request to said user equipment.

33. The communication system as recited in claim 24 wherein said second core network node is configured to perform a terminal identity reallocation procedure toward said user equipment.

34. The communication system as recited in claim 24 wherein said second core network node is configured to establish a radio access bearer with said radio access network, thereby transferring said user equipment from said first core network node to said second core network node.

35. A method, comprising:
- deriving a terminal identity for a user equipment at a first core network node;
- determining that said user equipment will be served by a second core network node without a request therefrom;
- receiving said terminal identity of said user equipment at a radio access network shared by said first core network node and said second core network node; and
- transmitting said terminal identity of said user equipment to said second core network node, thereby allowing said second core network node to serve said user equipment without deriving said terminal identity.

36. The method as recited in claim 35 further comprising receiving one of an attach, routing area update and location area update at said first core network node from said user equipment.

37. The method as recited in claim 35, further comprising:
- authenticating said terminal identity of said user equipment at said first core network node;
- receiving security parameters with said terminal identity of said user equipment at a radio access network; and
- transmitting said security parameters with said terminal identity of said user equipment to said second core network node, thereby allowing said second core network node to serve said user equipment without performing an authentication procedure.

38. The method as recited in claim 35 further comprising receiving said terminal identity of said user equipment at said radio access network in a redirect request message from said first core network node in response to one of a network command, an overload risk and a request for a non-supported feature.

39. The method as recited in claim 35 further comprising transmitting said terminal identity of said user equipment in one of a radio access network application part (RANAP) initial user equipment (UE) message and a redirect forward message to said second core network node.

40. The method as recited in claim 35 further comprising transmitting a routing area update request to said user equipment from said radio access network.

41. The method as recited in claim 35 further comprising performing a terminal identity reallocation procedure from said second core network node toward said user equipment.

42. The method as recited in claim 35 further comprising establishing a radio access bearer from said second core network node to said radio access network, thereby transferring said user equipment from said first core network node to said second core network node.

* * * * *